(12) United States Patent
Matsusue et al.

(10) Patent No.: US 9,786,938 B2
(45) Date of Patent: Oct. 10, 2017

(54) FUEL CELL SYSTEM

(75) Inventors: Masaaki Matsusue, Mishima (JP); Kotaro Ikeda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 503 days.

(21) Appl. No.: 14/382,079

(22) PCT Filed: Mar. 1, 2012

(86) PCT No.: PCT/JP2012/055191
§ 371 (c)(1),
(2), (4) Date: Dec. 11, 2014

(87) PCT Pub. No.: WO2013/128609
PCT Pub. Date: Sep. 6, 2013

(65) Prior Publication Data
US 2015/0111122 A1    Apr. 23, 2015

(51) Int. Cl.
*H01M 8/04*    (2016.01)
*H01M 8/04992*    (2016.01)
*H01M 8/10*    (2016.01)
*H01M 8/04537*    (2016.01)
*H01M 8/04746*    (2016.01)
*H01M 8/1018*    (2016.01)

(52) U.S. Cl.
CPC ... *H01M 8/04992* (2013.01); *H01M 8/04559* (2013.01); *H01M 8/04589* (2013.01); *H01M 8/04753* (2013.01); *H01M 8/10* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

2003/0211372 A1    11/2003    Adams et al.
2010/0092819 A1    4/2010    Umayahara et al.

FOREIGN PATENT DOCUMENTS

| CN | 101606260 A | 12/2009 |
|---|---|---|
| DE | 112008000334 T5 | 12/2009 |
| JP | 2005-093120 A | 4/2005 |
| JP | 2005-527943 A | 9/2005 |
| JP | 2008-017594 A | 1/2008 |
| JP | 2008-192468 A | 8/2008 |

*Primary Examiner* — Wyatt McConnell
(74) *Attorney, Agent, or Firm* — Andrews Kurth Kenyon LLP (57) ABSTRACT

A fuel cell system according to the present invention comprises: a fuel cell including a membrane-electrode assembly in which electrodes, each having a catalyst layer, are arranged on both surfaces of a polymer electrolyte membrane; and a control apparatus that performs performance recovery processing for the catalyst layer by decreasing an output voltage of the fuel cell to a predetermined voltage, wherein the control apparatus predicts a timing of an output increase request being made to the fuel cell and determines the necessity and content of the performance recovery processing based on a result of the prediction.

5 Claims, 7 Drawing Sheets

| DEGREE OF BRAKING | ~25% | 25%~50% | 50%~ |
|---|---|---|---|
| REFRESH VOLTAGE (V) | 0.6V | 0.4V | 0.05V |

FIG.7

| DEGREE OF BRAKING | ~10% | 10%~30% | 30%~ |
|---|---|---|---|
| REFRESH TIME PERIOD (SEC) | 0.5 | 1 | 3 |

FUEL CELL SYSTEM

CROSS-REFERENCE TO RELATED APPLICATIONS

This is a national phase application based on the PCT International Patent Application No. PCT/JP2012/055191 filed Mar. 1, 2012, the entire contents of which are incorporated herein by reference.

TECHNICAL FIELD

The present invention relates to a fuel cell system having a function of activating a catalyst.

BACKGROUND ART

A fuel cell stack is a power generation system which oxidizes a fuel through an electrochemical process to thereby directly convert energy released due to such oxidization reaction into electric energy. Such fuel cell stack has a membrane-electrode assembly in which a polymer electrolyte membrane, which selectively transports hydrogen ions, is sandwiched by a pair of electrodes made of porous materials. Each of the pair of electrodes includes: a catalyst layer that contains, as a main ingredient, carbon powder supporting a platinum-based metal catalyst and contacts with the polymer electrolyte membrane; and a gas diffusion layer formed on a surface of the catalyst layer, the gas diffusion layer having both air permeability and electronic conductivity.

In fuel cell systems of this type, when a cell continues to be operated within an operation zone where the cell voltage reaches an oxidation voltage (about 0.7 V to 1.0 V), an oxide film may be formed on a surface of the platinum catalyst in the catalyst layer and reduce an effective area of the platinum catalyst, which may cause degradation of output characteristics. In view of these circumstances, Patent Document 1 includes descriptions regarding processing in which, if the electric power requested to be generated by the fuel cell is less than a predetermined value, the supply of air (oxidant gas) to the fuel cell stack is stopped and the output voltage of the fuel cell stack is forcibly decreased by a DC/DC converter so that the cell voltage is lowered to a reduction voltage (e.g., 0.6 V or lower) to thereby remove an oxide film from the surface of the platinum catalyst and recover the performance of the catalyst layer (such processing will hereinafter be referred to as "refresh processing").

Patent Document 1 also describes, with regard to a fuel cell vehicle which uses the fuel cell system as an in-vehicle power supply, prohibiting the refresh processing if the fuel cell vehicle is traveling at a speed equal to or greater than a predetermined value.

PRIOR ART REFERENCE

Patent Document

Patent Document 1: JP2008-192468 A

SUMMARY OF THE INVENTION

Problem to be Solved by the Invention

As a result of recent research on the formation and removal of an oxide film in a catalyst layer, it has been recognized that not only a single stage of voltage but rather two or more stages of voltage exist as a reduction voltage enabling removal of such oxide film. For example, if there are two stages of reduction voltage, two types of film—a film which can be removed by decreasing the output voltage of the fuel cell stack to a reduction voltage as described in Patent Document 1 (hereinafter referred to as a "first reduction voltage") (such film will hereinafter be referred to as a "type-I oxide film") and a film which can be removed only after decreasing the output voltage to a second reduction voltage which is lower than the first reduction voltage (such film will hereinafter be referred to as a "type-II oxide film")—are present in a mixed state in an oxide film.

The refresh processing in Patent Document 1 assumes only a single stage of voltage for a reduction voltage enabling the removal of the oxide film (first reduction voltage). Thus, even if it is possible to remove the type-I oxide film by decreasing the output voltage of the fuel cell stack to such assumed first reduction voltage for a certain period of time, it is still impossible to remove the type-II oxide film. Thus, the performance of the catalyst layer may not necessarily be sufficiently recovered.

Meanwhile, if the refresh processing decreases the output voltage of the fuel cell stack to the second reduction voltage for the purpose of also removing the type-II oxide film, the performance of the catalyst layer is expected to be sufficiently recovered; however, the cell voltage becomes lower than in the case of decreasing the output voltage to the first reduction voltage and this could result in a significant degradation in responsiveness to a high-load request (output increase request). For example, if the cell voltage is greatly decreased in a fuel cell vehicle, it may be impossible to obtain an output which can follow the accelerator response at the time of a high-load request and this could lead to a significant degradation in drivability (controllability).

In view of the above, an object of the present invention is to propose a fuel cell system capable of maximizing the performance recovery of a catalyst layer while minimizing the influence on responsiveness to an output increase request.

Means for Solving the Problem

In order to achieve the above object, a fuel cell system according to the present invention comprises: a fuel cell including a membrane-electrode assembly in which electrodes, each having a catalyst layer, are arranged on both surfaces of a polymer electrolyte membrane; and a control apparatus that performs performance recovery processing for the catalyst layer by decreasing an output voltage of the fuel cell to a predetermined voltage, wherein the control apparatus predicts a timing of an output increase request being made to the fuel cell and determines the necessity and content of the performance recovery processing based on a result of the prediction.

In the above configuration, since the necessity of the performance recovery processing and the content (level) of the performance recovery processing to be performed can be determined according to the predicted timing of an output increase request, it is possible to achieve a balance between the minimization of the influence on responsiveness to an output increase request and the maximization of the performance recovery of the catalyst layer.

In the above configuration, if a first oxide film which is able to be removed by decreasing the output voltage of the fuel cell to a first film removal voltage and a second oxide film which is able to be removed only after decreasing the output voltage of the fuel cell to a second film removal voltage, which is lower than the first film removal voltage, are present in a mixed state in an oxide film formed on the catalyst layer during power generation by the fuel cell, the control apparatus may change the predetermined voltage to which the output voltage is to be decreased according to the result of the prediction when the performance recovery processing is determined necessary.

In the above configuration, the performance recovery processing is not performed in an equal manner when it is necessary, but rather, the processing can be performed by selecting whether to remove the first oxide film alone or to remove both the first and second oxide films according to the predicted timing of an output increase request. Accordingly, it is possible to achieve a balance between the minimization of the influence on responsiveness and the maximization of the performance recovery of the catalyst layer at a higher level.

For example, the control apparatus may be configured such that, if an output increase request to the fuel cell is predicted to be made at a timing before a first predetermined time period has passed, the output voltage of the fuel cell is decreased only to the first film removal voltage; whereas, if an output increase request to the fuel cell is predicted to be made at a timing after the first predetermined time period has passed or after a second predetermined time period, which is longer than the first predetermined time period, has passed, the output voltage of the fuel cell is decreased to the second film removal voltage.

In the above configuration, if it is predicted that an output increase request to the fuel cell will soon be made, first priority will be placed on minimizing the influence on the responsiveness to such output increase request and the output voltage of the fuel cell will thus be decreased only to the first film removal voltage. Whereas, if it is predicted that an output increase request to the fuel cell will not be made so soon, first priority will be placed on maximizing the performance recovery of the catalyst layer and the output voltage of the fuel cell will be thus decreased to the second film removal voltage.

In the above configuration, the control apparatus may decrease the output voltage of the fuel cell to the second film removal voltage if an output request made to the fuel cell is equal to or lower than a predetermined value (an example which corresponds to such case is an idling operation in a vehicle in which the fuel cell system is installed).

If the fuel cell system configured as above is installed in a fuel cell vehicle as an in-vehicle power supply, the control apparatus may predict a timing of an output increase request being made to the fuel cell based on the degree of braking.

Effect of the Invention

The present invention can provide a fuel cell system capable of maximizing the performance recovery of a catalyst layer while minimizing the influence on responsiveness to an output increase request.

DESCRIPTION OF REFERENCE NUMERALS

11 Fuel cell system
12 Fuel cell
24a Catalyst layer
25 Membrane-electrode assembly
60 Controller (control apparatus)

MODE FOR CARRYING OUT THE INVENTION

Embodiments of the present invention will be described below with reference to the attached drawings. The same apparatuses are given the same reference numeral and any repetitive descriptions will be omitted.

Embodiment 1

Figure 1:
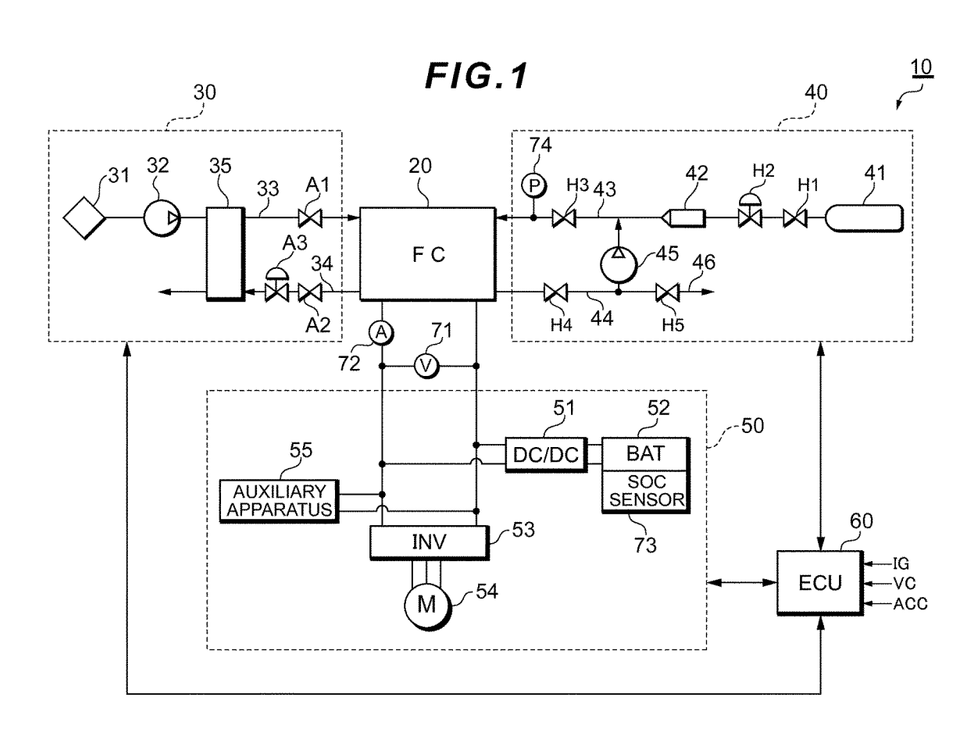
FIG. 1 is a configuration diagram showing a fuel cell system according to an embodiment of the present invention.

FIG. 1 illustrates the system configuration of a fuel cell system 10 according to Embodiment 1.

The fuel cell system 10 serves as an in-vehicle power supply system that is installed in a fuel cell vehicle and includes: a fuel cell stack 20 which receives supply of reactant gases (a fuel gas and an oxidant gas) and generates electric power; an oxidant gas supply system 30 for supplying the air serving as the oxidant gas to the fuel cell stack 20; a fuel gas supply system 40 for supplying a hydrogen gas serving as the fuel gas to the fuel cell stack 20; a power system 50 for controlling charge and discharge of electric power; and a controller 60 which controls the entire system.

The fuel cell stack 20 is a solid polymer electrolyte-type cell stack in which a plurality of cells are stacked in series. In the fuel cell stack 20, the oxidation reaction in formula (1) occurs in an anode and the reduction reaction in formula (2) occurs in a cathode. The electrogenic reaction in formula (3) occurs in the fuel cell stack 20 as a whole.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

The fuel cell stack 20 is provided with: a voltage sensor 71 for detecting an output voltage of the fuel cell stack 20 (FC voltage); and a current sensor 72 for detecting an output current of the fuel cell stack 20 (FC current).

The oxidant gas supply system 30 includes: an oxidant gas path 33 in which the oxidant gas to be supplied to the cathode in the fuel cell stack 20 flows; and an oxidant off-gas path 34 in which an oxidant off-gas discharged from the fuel cell stack 20 flows. The oxidant gas path 33 is provided with: an air compressor 32 which introduces the oxidant gas from the atmosphere via a filter 31; a humidifier 35 which humidifies the oxidant gas compressed by the air compressor 32; and a cutoff valve A1 for cutting off the supply of the oxidant gas to the fuel cell stack 20.

The oxidant off-gas path 34 is provided with: a cutoff valve A2 for cutting off the discharge of the oxidant off-gas from the fuel cell stack 20; a backpressure regulating valve A3 for regulating the supply pressure of the oxidant gas; and a humidifier 35 for exchanging moisture between the oxidant gas (dry gas) and the oxidant off-gas (wet gas).

The fuel gas supply system 40 includes: a fuel gas supply source 41; a fuel gas path 43 in which the fuel gas to be supplied from the fuel gas supply source 41 to the anode in the fuel cell stack 20 flows; a circulation path 44 for returning the fuel off-gas discharged from the fuel cell stack 20 to the fuel gas path 43; a circulation pump 45 which pumps the fuel off-gas in the circulation path 44 to send it to the fuel gas path 43; and an exhaust/drain path 46 which branches from the circulation path 44.

The fuel gas supply source 41 is constituted from, for example, a high-pressure hydrogen tank, a hydrogen absorbing alloy or similar and stores a hydrogen gas at a high pressure (e.g., 35 MPa to 70 MPa). When opening a cutoff valve H1, the fuel gas flows from the fuel gas supply source 41 toward the fuel gas path 43. The pressure of the fuel gas is reduced to, for example, about 200 kPa by, for example, a regulator H2 and an injector 42, and then the fuel gas is supplied to the fuel cell stack 20.

The circulation path 44 is connected to a cutoff valve H4 for cutting off the discharge of the fuel off-gas from the fuel cell stack 20 and the exhaust/drain path 46 branching from the circulation path 44. The exhaust/drain path 46 is provided with an exhaust/drain valve H5. The exhaust/drain valve H5 is actuated by a command from the controller 60 so as to discharge water, as well as the fuel off-gas containing impurities within the circulation path 44, toward the outside.

The fuel off-gas discharged from the exhaust/drain valve H5 is mixed with the oxidant off-gas flowing through the oxidant off-gas path 34 and diluted by a diluter (not shown). The circulation pump 45 is driven by a motor so as to circulate the fuel off-gas within the circulation system and supply it to the fuel cell stack 20.

The power system 50 includes a DC/DC converter 51, a battery 52, a traction inverter 53, a traction motor 54 and auxiliary apparatuses 55. The DC/DC converter 51 has: a function of increasing a direct-current voltage supplied from the battery 52 and outputting the resulting voltage to the traction inverter 53; and a function of decreasing the voltage of direct-current power generated by the fuel cell stack 20 or the voltage of regenerative power collected by the traction motor 54 as a result of regenerative braking, in order to charge the battery 52 with the resulting power.

The battery 52 functions as: a storage source for excess electric power; a storage source for regenerative energy during a regenerative braking operation; or an energy buffer provided for a load change resulting from acceleration or deceleration of a fuel cell vehicle. Suitable examples of the battery 52 may include a secondary cell, such as a nickel-cadmium battery, a nickel-hydrogen battery and a lithium battery. An SOC (State of Charge) sensor is attached to the battery 52 to detect the state of charge, being the remaining power, of the battery 52.

The traction inverter 53 may be, for example, a PWM inverter driven by pulse width modulation and the traction inverter 53 converts a direct-current voltage output from the fuel cell stack 20 or the battery 52 to a three-phase alternating current voltage in accordance with a control command provided by the controller 60 and controls a rotation torque of the traction motor 54. The traction motor 54 may be, for example, a three-phase alternating current motor which constitutes a power source of the fuel cell vehicle.

The auxiliary apparatuses 55 collectively refer to motors provided in respective parts of the fuel cell system 10 (e.g., power sources for the pumps), inverters for driving these motors, various types of in-vehicle auxiliary apparatuses (e.g., an air compressor, injector, cooling-water circulation pump, radiator, etc.).

The controller 60 is a computer system which includes a CPU, a ROM, a RAM, input/output interfaces and the like, wherein the controller 60 controls components of the fuel cell system 10. For example, when receiving a start signal IG output from an ignition switch, the controller 60 starts the operation of the fuel cell system 10 and obtains electric power required from the entire system based on an accelerator opening degree signal ACC output from an acceleration sensor and a vehicle speed signal VC output from a vehicle speed sensor. The electric power required from the entire system is the sum of the amount of electric power for the vehicle travel and the amount of electric power for the auxiliary apparatuses.

The electric power for the auxiliary apparatuses includes electric power consumed by the in-vehicle auxiliary apparatuses (the humidifier, air compressor, hydrogen pump, cooling-water circulation pump, etc.), electric power consumed by apparatuses which are required for the travel of the vehicle (a transmission, wheel control apparatus, steering gear, suspension, etc.), electric power consumed by apparatuses provided inside the passenger compartment (an air conditioner, lighting equipment, audio system, etc.), and the like.

The controller 60 determines the distribution ratio of the electrical power output from the fuel cell stack 20 and the electric power output from the battery 52 and controls the oxidant gas supply system 30 and the fuel gas supply system 40 so that the amount of electric power generated by the fuel cell stack 20 matches with a target electric power. The controller 60 further controls the DC/DC converter 51 so as to regulate the output voltage of the fuel cell stack 20 and thereby control the operating point (the output voltage and the output current) of the fuel cell stack 20.

Figure 2:
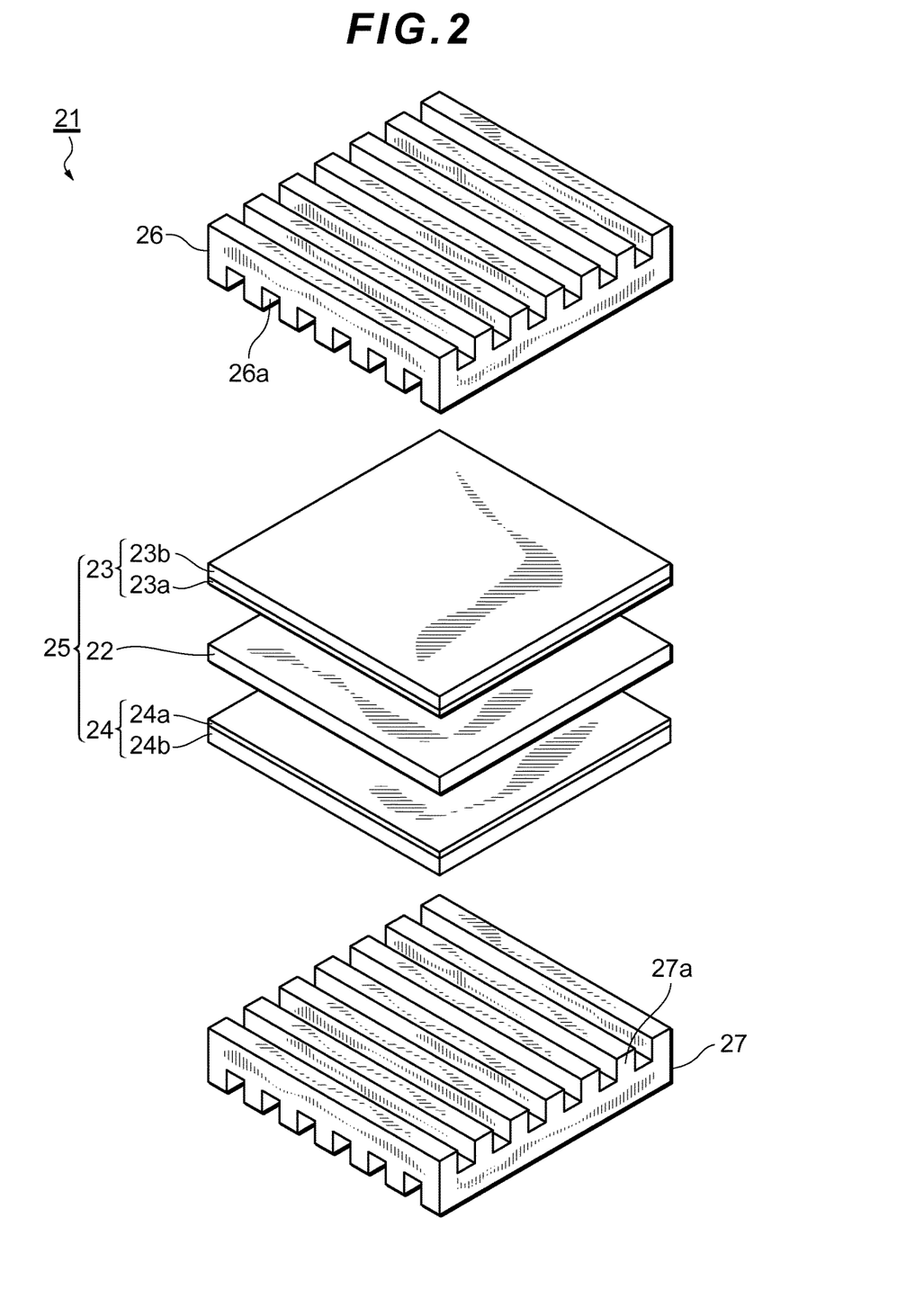
FIG. 2 is an exploded perspective view showing a cell constituting a fuel cell stack.

FIG. 2 is an exploded perspective view showing a cell 21 constituting the fuel cell stack 20.

The cell 21 includes a polymer electrolyte membrane 22, an anode 23, a cathode 24 and separators 26 and 27. The anode 23 and the cathode 24 are diffusion electrodes having a sandwich structure in which such electrodes sandwich the polymer electrolyte membrane 22 from both sides thereof.

The separators 26 and 27 are made of a gas impermeable conductive member and they further sandwich the above sandwich structure from both sides thereof and form a fuel gas flow path and an oxidant gas flow path between the separators and the anode 23 and cathode 24, respectively. The separator 26 is provided with ribs 26a having a recessed shape in cross section.

By allowing the ribs 26a to abut onto the anode 23, the openings of the ribs 26a are closed so as to form the fuel gas flow path. The separator 27 is provided with ribs 27a having a recessed shape in cross section. By allowing the ribs 27a to abut onto the cathode 24, the openings of the ribs 27a are closed so as to form the oxidant gas flow path.

The anode 23 includes: a catalyst layer 23a which contains, as a main ingredient, carbon powder that supports a platinum-based metal catalyst (Pt, Pt—Fe, Pt—Cr, Pt—Ni, Pt—Ru, etc.) and contacts with the polymer electrolyte membrane 22; and a gas diffusion layer 23b formed on a surface of the catalyst layer 23a and having both permeability and electronic conductivity. The cathode 24 also includes a catalyst layer 24a and a gas diffusion layer 24b in the same way.

More specifically, the catalyst layers 23a and 24a are formed by dispersing the carbon powder, which is supporting platinum or an alloy consisting of platinum and other metal(s), into a suitable organic solvent, adding thereto an appropriate quantity of an electrolyte solution to turn it into a paste, and screen-printing the paste onto the polymer electrolyte membrane 22. The gas diffusion layers 23b and 24b may be formed of carbon cloth, carbon paper or carbon felt which is woven by carbon fiber yarn.

The polymer electrolyte membrane 22 is a proton-conducting ion-exchange membrane made of a solid polymer material (e.g., fluorinated resin) and such polymer electrolyte membrane 22 exhibits a preferable electrical conductivity in wet conditions. The polymer electrolyte membrane 22, the anode 23, and the cathode 24 form a membrane-electrode assembly 25.

Figure 3:
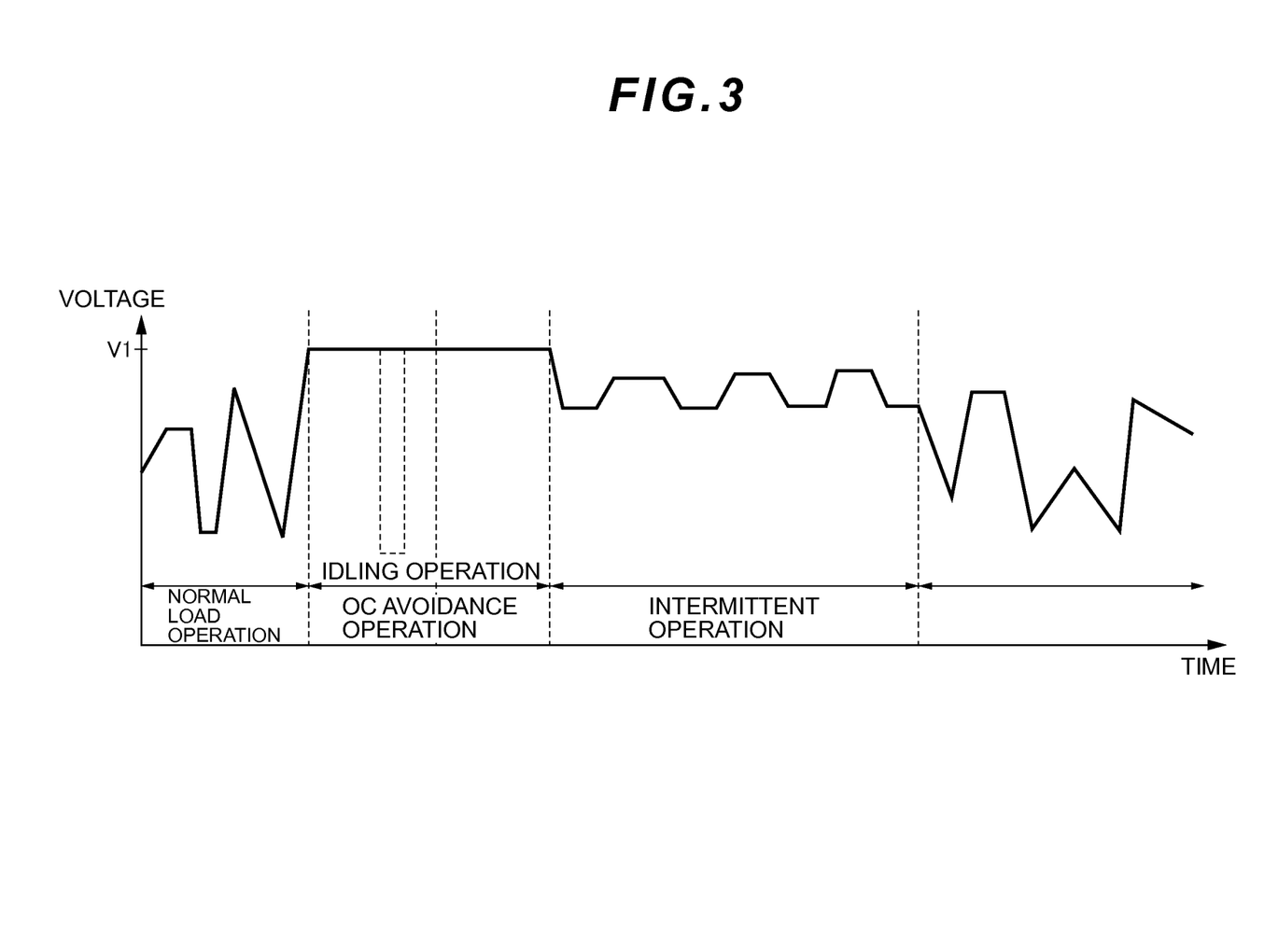
FIG. 3 is a timing chart showing one example of operation control of a fuel cell system.

FIG. 3 is a timing chart showing operation control of the fuel cell system 10.

The fuel cell system 10 is configured so as to improve its power generation efficiency by switching the operation modes of the fuel cell stack 20 in accordance with the operation load.

For example, in a low load zone with a low power generation efficiency (an operation zone where the amount of power requested to be generated is less than a predetermined value), the fuel cell system 10 performs an intermittent operation in which the operation is controlled by setting a power generation command value for the fuel cell stack 20 to zero, and the electric power required for travel of the vehicle and the electric power required for operation of the system are covered by the electric power supplied from the battery 52. It should be noted that the cell voltage is held relatively high during the intermittent operation because drivability will deteriorate if the cell voltage is low when a high-load request (output increase request) is received during the intermittent operation.

On the other hand, in a high load zone with a high power generation efficiency (an operation zone where the amount of power requested to be generated is equal to or higher than a predetermined value), the fuel cell system 10 performs a normal load operation in which the operation is controlled by calculating a power generation command value for the fuel cell stack 20 based on the degree of opening of an accelerator and the vehicle speed, and electric power required for travel of the vehicle and electric power required for operation of the system are covered only by electric power generated by the fuel cell stack 20 or by electric power generated by the fuel cell stack 20 and electric power supplied from the battery 52.

When the vehicle is stopped, for example, immediately after the vehicle is started or while the vehicle is stopping at a red light, in other words, when the shift lever is in the P-range or N-range, or when the brake pedal is pressed and the vehicle speed is zero even though the shift lever is in the D-range, the fuel cell system 10 performs an idling operation in which it operates the fuel cell stack 20 to generate electric power at a power generation voltage required for ensuring drivability while charging the battery 52 with the generated power.

In a state where the cathode 24 is held at a high voltage, for example, during an idling operation described above, a platinum catalyst in the catalyst layer 24a may be dissolved, and thus, the fuel cell stack 20 is operated under a high-potential avoidance control (OC avoidance operation) in which the output voltage of the fuel cell stack 20 is controlled so as not to exceed an upper limit voltage V1, to thereby maintain the durability of the fuel cell stack 20. The upper limit voltage V1 is set to, for example, around 0.9 V per cell.

Figure 4:
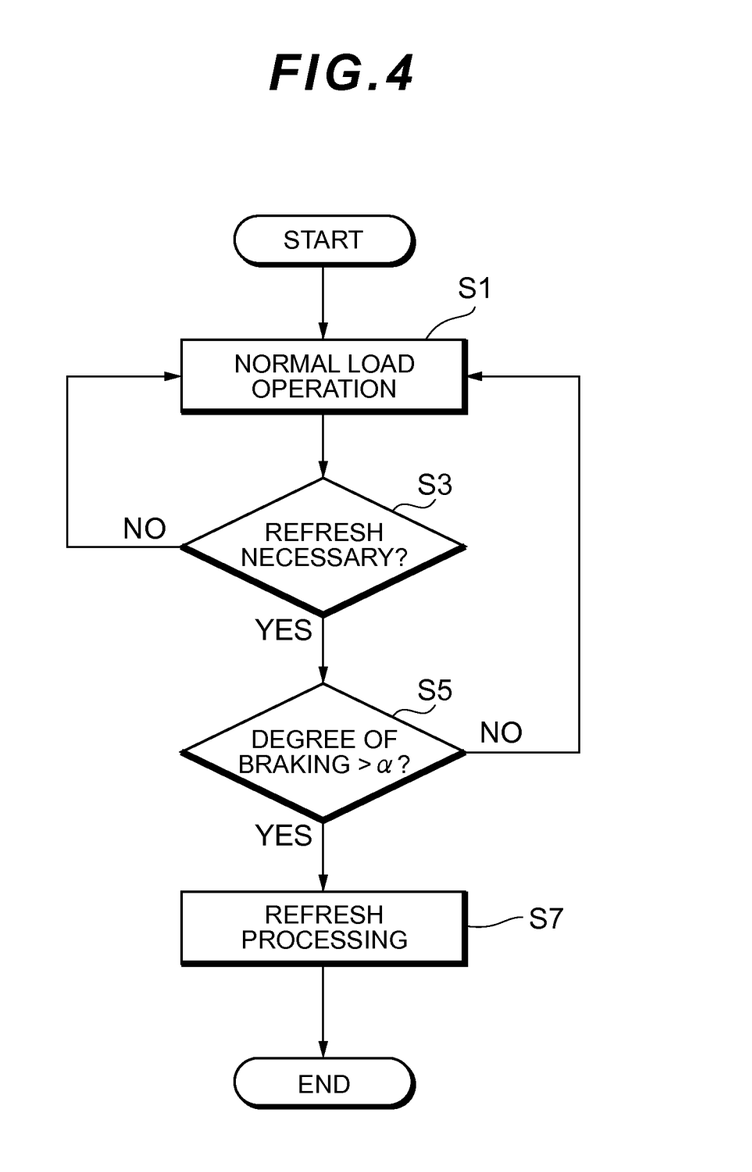
FIG. 4 is a flowchart showing the procedure for performing refresh processing under the condition that the degree of braking exceeds a predetermined threshold.

FIG. 4 is a flowchart showing the procedure for performing the refresh processing under the condition that the degree of braking exceeds a predetermined threshold.

It should be noted that, although FIG. 3 mentioned above describes an example in which the necessity of the refresh processing is determined during an idling operation (for example, while the vehicle is stopping at a red light) after a normal load operation, FIG. 4 will describe an example in which the necessity of the refresh processing is determined during a normal load operation.

During a normal load operation (step S1), the controller 60 determines the necessity of the refresh processing at predetermined time intervals (step S3). The necessity of the refresh processing is determined by estimating an amount of oxide film formation (the surface area of the formed oxide film) and judging whether or not the estimated amount of oxide film formation exceeds a predetermined threshold, the estimation being performed by, for example, conducting a time integration based on the time elapsed from the previous refresh processing, referring to a map generated based on results of experiments or simulations, conducting theoretical computations, or referring to an output tendency during the high-potential avoidance control.

In the fuel cell stack 20, hydrogen ions generated at the anode 23, as shown by formula (1) above, pass through the electrolyte membrane 22 and move to the cathode 24, and the hydrogen ions that have moved to the cathode 24 electrochemically react with oxygen in the oxidant gas supplied to the cathode 24 and cause a reduction reaction of oxygen, as shown by formula (2) above. Due to this, the platinum catalyst surface of the catalyst layer 24a is covered by an oxide film, which will reduce an effective area and degrade the power generation efficiency (output characteristics).

The refresh processing is processing in which the cell voltage is decreased to a reduction voltage (hereinafter also referred to as a "refresh voltage") for a predetermined time period (hereinafter also referred to as a "refresh time period") so as to reduce the oxide film and remove it from the catalyst surface. More specifically, the voltage of each cell, namely, the output voltage of the fuel cell stack 20 is lowered for a predetermined time period, so as to increase the output current and shift the electrochemical reaction occurring at the catalyst layer 24a from an oxidation reaction zone to a reduction reaction zone, thereby recovering the catalytic activity.

If the estimated amount of oxide film formation does not exceed the predetermined threshold (step S3: NO), the controller 60 returns to the normal load operation (step S1). If the estimated amount does exceed the predetermined threshold (step S3: YES), the controller 60 determines whether or not the degree of braking exceeds a threshold α based on a braking degree signal output from a brake sensor (step S5). The threshold α is set to, for example, a value of 5% to 10%.

If the degree of braking does not exceed the threshold α (step S5: NO), in other words, if the amount that the brake pedal is pressed is below a certain level, the processing goes back to step S1.

If the degree of braking exceeds the threshold α (step S5: YES), for example, if the operation mode of the fuel cell stack 20 is an idling operation, e.g., while the vehicle is stopping at a red light, and the degree of braking is full, the controller 60 performs the refresh processing (step S7).

It should be noted that the refresh processing in this embodiment is performed at a constant refresh voltage (reduction voltage) and for a constant refresh time period (time period of holding the reduction voltage), regardless of the degree of braking.

Here, from the viewpoint of maximizing the performance recovery of the catalyst layer 24a, the refresh voltage in such refresh processing is preferably low enough to enable the removal of a type-II oxide film or a type-III oxide film, which will be described later.

As described above, in order to allow the refreshing processing to be performed in this embodiment, at least two conditions should be met: (1) the amount of oxide film formation needs to be in excess of a predetermined threshold; and (2) the degree of braking needs to be in excess of a predetermined threshold α. In other words, even if the amount of oxide film formation exceeds a predetermined threshold, the refresh processing is prohibited if the degree of braking does not exceed a predetermined threshold α.

When the degree of braking exceeds such threshold α, it means that the amount that the brake pedal is pressed is large and, in such case, it can be considered that a high-load request is less likely to be ordered. In this embodiment, the refresh processing is performed in such a state where a high-load request is less likely to be ordered, so that the performance recovery of the catalyst layer 24a can be maximized and, at the same time, the influence on drivability can be minimized.

Embodiment 2

Figure 5:
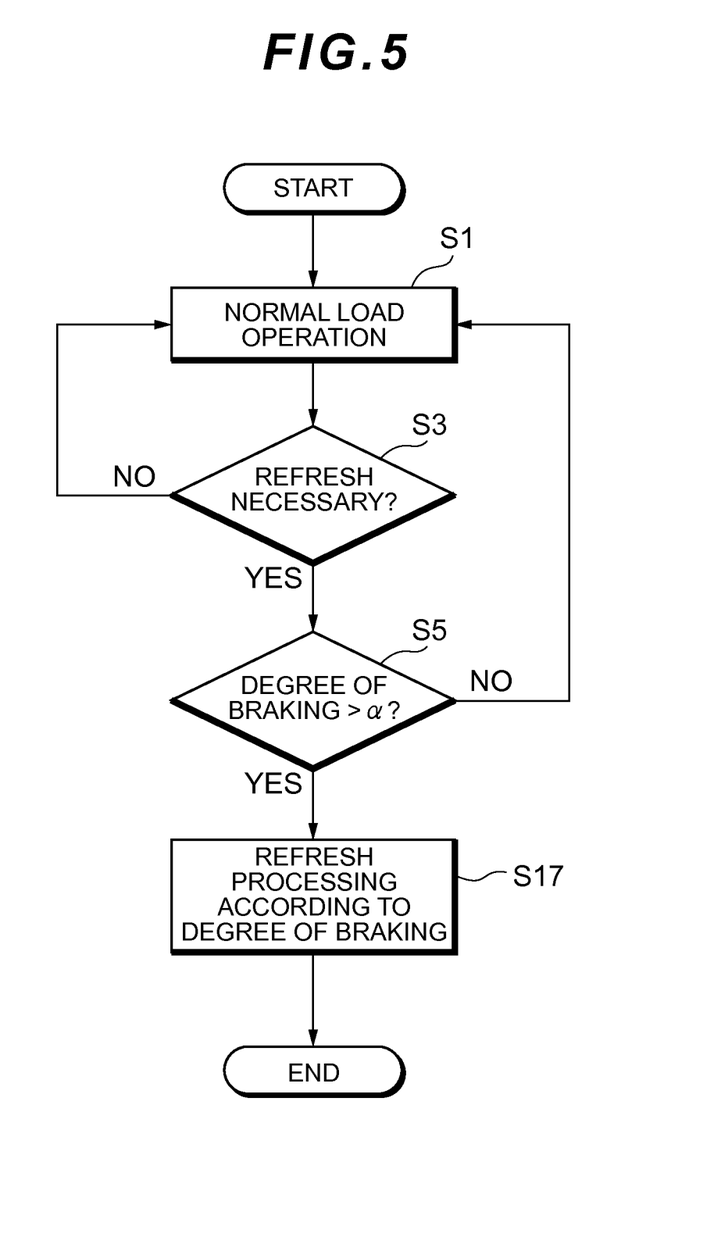
FIG. 5 is a flowchart showing the procedure for performing refresh processing when the degree of braking exceeds a predetermined threshold, in accordance with such degree of braking.

FIG. 5 is a flowchart showing the procedure for performing the refresh processing when the degree of braking exceeds a predetermined threshold, in accordance with such degree of braking.

Figure 6:
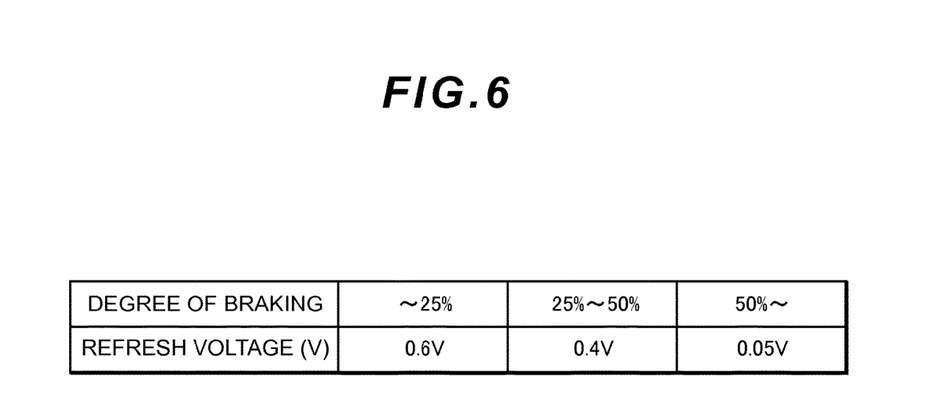
FIG. 6 is a table showing one example of the refresh processing shown in FIG. 5 performed according to the degree of braking, the table showing the relationship between the degree of braking and a refresh voltage.
Figure 7:
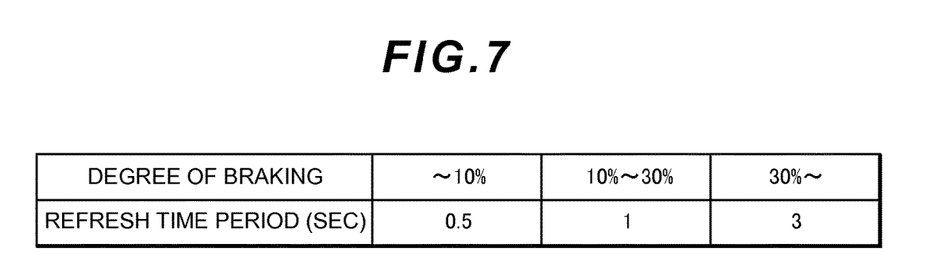
FIG. 7 is a table showing one example of the refresh processing shown in FIG. 5 performed according to the degree of braking, the table showing the relationship between the degree of braking and a refresh time period.

FIGS. 6 and 7 each show an example of the refresh processing shown in FIG. 5 performed according to the degree of braking. FIG. 6 is a table showing the relationship between the degree of braking and a refresh voltage and FIG. 7 is a table showing the relationship between the degree of braking and a refresh time period.

The flowchart shown in FIG. 5 will now be described. Since steps S1 to S5 in FIG. 5 are the same processes as steps S1 to S5 in FIG. 4, these steps are given the same numbers and the descriptions thereof will be omitted here. The process of step S17, which follows step S5, will be described in detail below.

In the refresh processing performed in step S7 in FIG. 4, the refresh voltage and the refresh time period are each set to a constant value, regardless of the degree of braking. In contrast, in the refresh processing performed in step S17 in FIG. 5, the refresh voltage and/or the refresh time period are configured to be changed according to the degree of braking.

(Change of Refresh Voltage)

For example, as shown in FIG. 6, if the degree of braking is equal to or less than 25%, the refresh voltage is 0.6 V (hereinafter referred to as "pattern V1"), and the refresh processing having such refresh voltage can remove a type-I oxide film, which will be described later.

If the degree of braking is greater than 25% and equal to or less than 50%, the refresh voltage is 0.4 V (hereinafter referred to as "pattern V2"), and the refresh processing having such refresh voltage can remove a type-II oxide film, which will be described later. If the degree of braking is greater than 50%, the refresh voltage is 0.05 V (hereinafter referred to as "pattern V3"), and the refresh processing having such refresh voltage can remove a type-III oxide film, which will be described later.

Figure 8:
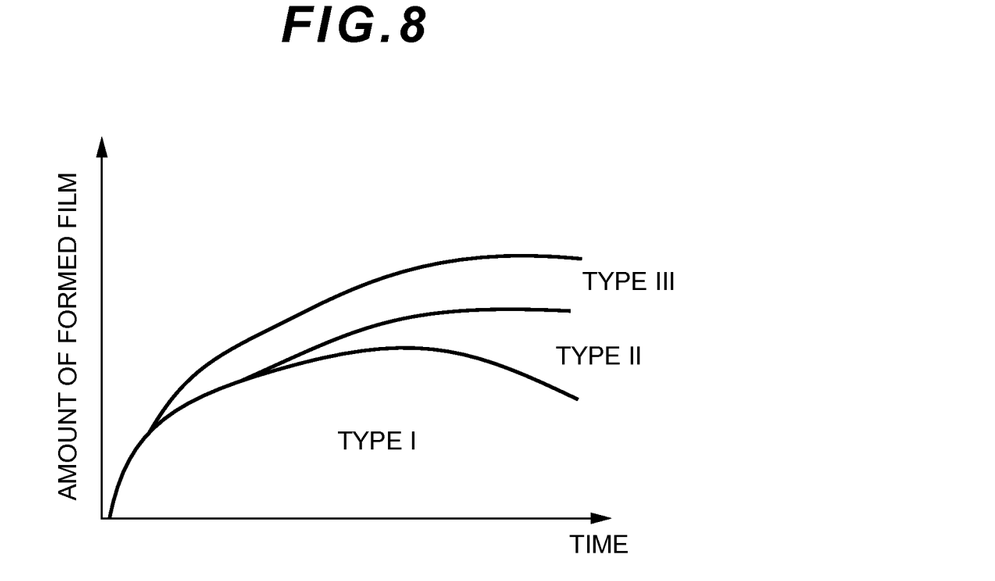
FIG. 8 is a view showing how the respective proportions of a type-I oxide film, a type-II oxide film and a type-III oxide film in an oxide film formed on a catalyst layer vary over time when the output voltage of a fuel cell stack is held at a constant value.

The type-I oxide film, type-II oxide film and type-III oxide film are known as films that may be present in a mixed state in a single oxide film. Further, when the output voltage of the fuel cell stack 20 is held at a constant oxide film formation voltage (oxidation voltage), the proportions of the three types of oxide films in the entire oxide film are known to gradually vary as the holding time passes, as shown, for example, in FIG. 8. Furthermore, the magnitudes of the reduction voltages thereof are known to have the relationship set out below.

Relationship in Magnitude of Reduction Voltages

Type-I oxide film (e.g., 0.65 V to 0.9 V)>Type-II oxide film (e.g., 0.4 V to 0.6 V)>Type-III oxide film (e.g., 0.05 V to 0.4 V)

Figure 9:
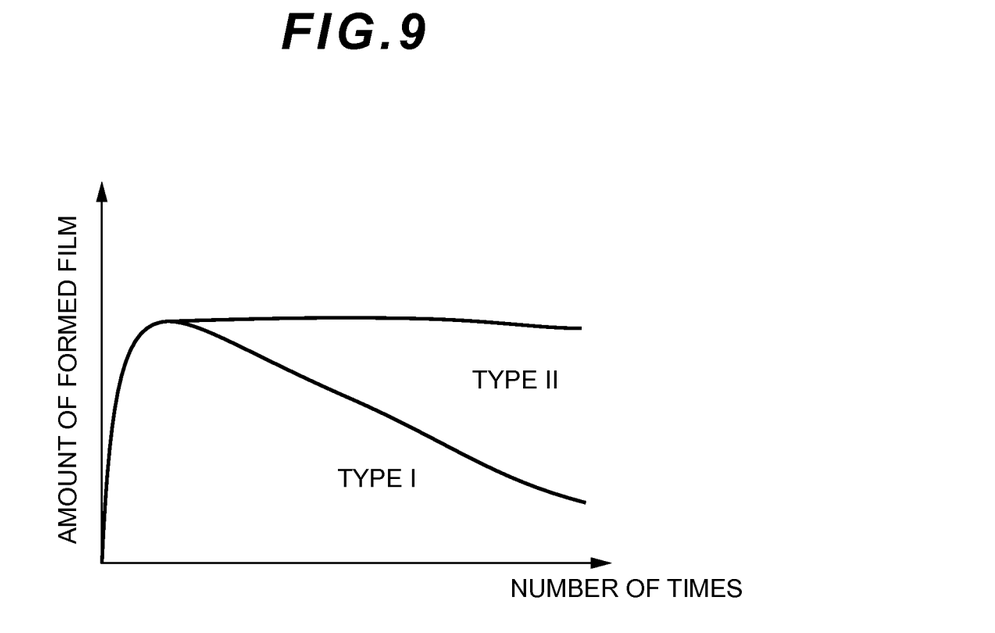
FIG. 9 is a view showing how the respective proportions of a type-I oxide film and a type-II oxide film in an oxide film formed on a catalyst layer vary in accordance with an increase in the number of times the output voltage of a fuel cell stack crosses a predetermined boundary voltage during its increase and decrease.

In addition, the respective proportions of the type-I oxide film, type-II oxide film and type-III oxide film in the entire oxide film are also known to gradually vary as the number of times the output voltage of the fuel cell stack 20 crosses a predetermined boundary voltage (e.g., 0.8 V) during its increase and decrease (hereinafter referred to as the "number of cycles") increases, as shown, for example, in FIG. 9 (the type-III oxide film is not shown in FIG. 9).

In this embodiment, the refresh voltage is changed according to the degree of braking, in other words, according to the level of possibility that the accelerator pedal will soon be pressed and the amount of power requested to be generated by the fuel cell stack 20 will increase. For example, in pattern V1 where the degree of braking is relatively small, it can be considered that the possibility of the accelerator pedal being pressed is relatively high compared to patterns V2 and V3. Thus, more consideration is given to minimizing the influence on drivability, and the refresh voltage is accordingly set to the highest value so that only the type-I oxide film is allowed to be removed.

On the other hand, in pattern V3 where the degree of braking is relatively large, it can be considered that the possibility of the accelerator pedal being pressed is quite low compared to patterns V1 and V2. Thus, not so much consideration is given to the influence on drivability, and rather, more consideration is given to maximizing the performance recovery of the catalyst layer 24a. The refresh voltage is accordingly set to the lowest value so as to thereby allow all of the type-I oxide film, type-II oxide film and type-III oxide film to be removed.

In intermediate pattern V2, the possibility of the accelerator pedal being pressed is lower than in pattern V1 but not so low as in pattern V3. Thus, in order to balance the influence on drivability and the performance recovery of the catalyst layer 24a at as high a level as possible, the refresh voltage is set to a value between the voltage of pattern V1 and the voltage of pattern V2 to thereby allow the type-I oxide film and type-II oxide film to be removed.

(Change of Refresh Time Period)

For example, as shown in FIG. 7, if the degree of braking is equal to or less than 10%, the refresh time period is 0.5 seconds (hereinafter referred to as "pattern T1"), if the degree of braking is greater than 10% and equal to or less than 30%, the refresh time period is one second (hereinafter referred to as "pattern T2"), and if the degree of braking is greater than 30%, the refresh time period is 3 seconds.

In this embodiment, the refresh time period is changed according to the degree of braking, in other words, according to the level of possibility that the accelerator pedal will soon be pressed and the amount of power requested to be generated by the fuel cell stack 20 will increase. For example, in pattern T1 where the degree of braking is relatively small, it can be considered that the possibility of the accelerator pedal being pressed is relatively high compared to patterns T2 and T3. Thus, more consideration is given to minimizing the influence on drivability and the refresh time period is accordingly set to the shortest value.

On the other hand, in pattern T3 where the degree of braking is relatively large, it can be considered that the possibility of the accelerator pedal being pressed is quite low compared to patterns T1 and T2. Thus, not so much consideration is given to the influence on drivability, and rather, more consideration is given to maximizing the performance recovery of the catalyst layer 24a and the refresh time period is accordingly set to the longest value.

In intermediate pattern T2, the possibility of the accelerator pedal being pressed is lower than in pattern T1 but not so low as in pattern T3. Thus, in order to balance the influence on drivability and the performance recovery of the catalyst layer 24a at as high a level as possible, the refresh time period is set to a value between the value of pattern T1 and the value of pattern T2.

In this embodiment, the amount of removed oxide film increases in the order of pattern T1, pattern T2 and pattern T3. In other words, in a situation where the deterioration of drivability is a matter of concern (pattern T1), the time period for holding the cell voltage at a low value is made as short as possible, to thereby place priority on drivability; whereas, in a situation where the deterioration of drivability is not a great concern (pattern T2), the time period for holding the cell voltage at a low value may be long and, accordingly, priority is placed on maximizing the amount of removed oxide film.

The refresh processing may be performed by combining the above two examples shown in FIGS. 6 and 7.

For example, the refresh processing may be performed by: setting the refresh voltage and refresh time period to 0.6 V and 0.5 seconds, respectively, if the degree of braking is equal to or less than 10%; setting the refresh voltage and refresh time period to 0.6 V and 1 second, respectively, if the degree of braking is greater than 10% and equal to or less than 25%; setting the refresh voltage and refresh time period to 0.4 V and 1 second, respectively, if the degree of braking is greater than 25% and equal to or less than 30%; setting the refresh voltage and refresh time period to 0.4 V and 3 seconds, respectively, if the degree of braking is greater than 30% and equal to or less than 50%; and setting the refresh voltage and refresh time period to 0.05 V and 3 seconds, respectively, if the degree of braking is greater than 50%.

Each of the above-described embodiments describes an example in which the timing of an output increase request being made to the fuel cell 20 is predicted according to the degree of braking in the fuel cell vehicle in which the fuel cell system 10 is installed, but the way of predicting the timing of an output increase request being made to the fuel cell 20 is not limited thereto. For example, the timing of an output increase request may be predicted by assuming that the degree of braking is 100% when the shift lever is in the P-, N- or B-range.

Each of the above-described embodiments describes an example in which the fuel cell system 10 is used as an in-vehicle power supply system, but the use of the fuel cell system 10 is not limited thereto. For example, the fuel cell system 10 may be installed as a power source for moving objects (robots, ships, airplanes, etc.) other than fuel cell vehicles. Further, the fuel cell system 10 according to the above embodiments may be used as power generation equipment (stationary power generation system) for houses and buildings, etc.

What is claimed is:

1. A fuel cell system comprising:
a fuel cell including a membrane-electrode assembly in which electrodes, each having a catalyst layer, are arranged on both surfaces of a polymer electrolyte membrane; and
a control apparatus that is configured to perform performance recovery processing for the catalyst layer by decreasing an output voltage of the fuel cell to a predetermined voltage,
wherein the control apparatus is further configured to predict a timing of an output increase request being made to the fuel cell and configured to determine whether to perform, and a content of, the performance recovery processing based on a result of the prediction, such that said control apparatus is to predict to perform the performance recovery processing if an estimated amount of oxide film formation on the catalyst layer exceeds a predetermined threshold.

2. The fuel cell system according to claim 1,
wherein a mixed state oxide film includes a first type of oxide which is able to be removed by decreasing the output voltage of the fuel cell to a first film removal voltage and a second type of oxide which is able to be removed only after decreasing the output voltage of the fuel cell to a second film removal voltage, which is lower than the first film removal voltage, and is formed on the catalyst layer during power generation by the fuel cell, and
wherein the control apparatus is configured to change the predetermined voltage to which the output voltage is to be decreased according to the result of the prediction when the performance recovery processing is determined to be performed.

3. The fuel cell system according to claim 2,
wherein, if an output increase request to the fuel cell is predicted to be made at a timing before a first predetermined time period has passed, the control apparatus is configured to decrease the output voltage of the fuel cell to the first film removal voltage; whereas, if an output increase request to the fuel cell is predicted to be made at a timing after the first predetermined time period has passed or after a second predetermined time period, which is longer than the first predetermined time period, has passed, the control apparatus is configured to decrease the output voltage of the fuel cell to the second film removal voltage.

4. The fuel cell system according to claim 3,
wherein the control apparatus is configured to decrease the output voltage of the fuel cell to the second film removal voltage if an output request made to the fuel cell is equal to or lower than a predetermined value.

5. The fuel cell system according to claim 1, which is installed in a fuel cell vehicle as an in-vehicle power supply,
wherein the control apparatus is configured to predict a timing of an output increase request being made to the fuel cell based on a degree of braking.

* * * * *